US006257043B1

United States Patent
Wiens

(10) Patent No.: US 6,257,043 B1
(45) Date of Patent: Jul. 10, 2001

(54) MODIFIED FLAT HEM APPARATUS AND METHOD

(75) Inventor: Philip V. Wiens, Ontario (CA)

(73) Assignee: Unova IP Corp., Woodland Hills, CA (US)

( * ) Notice: Subject to any disclaimer, the term of this patent is extended or adjusted under 35 U.S.C. 154(b) by 0 days.

(21) Appl. No.: 09/475,748

(22) Filed: Dec. 30, 1999

(51) Int. Cl.⁷ .................................................. B21D 39/02
(52) U.S. Cl. ................................ 72/412; 72/316; 72/322; 29/509; 29/243.58
(58) Field of Search .......................... 72/323, 322, 316, 72/412; 29/509, 513, 521, 243.58

(56) References Cited

U.S. PATENT DOCUMENTS

| | | | |
|---|---|---|---|
| 2,455,767 | * 12/1948 | Henchert | 29/509 |
| 4,604,786 | * 8/1986 | Howie | 29/513 |
| 4,642,871 | * 2/1987 | Ookubo | 29/513 |
| 4,719,689 | * 1/1988 | Yamamoto | 29/458 |
| 5,195,580 | * 3/1993 | Hoeffken | 29/509 |
| 5,272,903 | * 12/1993 | Evans | 29/243.58 |
| 5,315,855 | * 5/1994 | Jackson | 72/315 |
| 5,457,981 | * 10/1995 | Brown | 72/451 |
| 6,000,118 | * 12/1999 | Biernat | 29/458 |
| 6,029,334 | * 2/2000 | Hartley | 29/509 |

FOREIGN PATENT DOCUMENTS

686651 * 7/1930 (FR) ........................................ 72/323

* cited by examiner

*Primary Examiner*—Daniel C. Crane
(74) *Attorney, Agent, or Firm*—Reising, Ethington, Barnes, Kisselle, Learman & McCulloch, P.C.

(57) ABSTRACT

A hemming steel constructed to fold or hem a flange of an outer sheet metal panel onto an inner sheet metal panel has a forming face with a first, generally flat section and a second section inclined to the first section to provide a finished, hemmed flange having an outer portion closed or folded flat onto the inner sheet metal panel and an inner portion adjacent to the fold line which is inclined to the outer portion providing a reduced radius of the fold line bend. The second section of the hemming steel is preferably generally planar such that the inner portion of the hemmed flange is generally flat and provides an outer bend diameter along the fold line of the outer sheet metal panel which is less than three times the thickness of the sheet metal panel and may be approximately equal to or less than the thickness of the outer panel. The reduced bend diameter is believed to provide a smooth and fair fold line which has a more consistent appearance when viewed from different angles to improve the appearance of the panels of the vehicle body in assembly. Further, with the outer portion of the hemmed flange folded flat against the inner sheet metal panel, no sealing operation is required to prevent foreign material from collecting between the flange and inner panel. The angle at which the second section of the forming face is inclined relative to the first section can be changed to allow the location of the peripheral edge of the inner panel to be varied relative to the fold line.

16 Claims, 3 Drawing Sheets

MODIFIED FLAT HEM APPARATUS AND METHOD

FIELD OF THE INVENTION

This invention relates generally to the hemming of sheet metal and more particularly, to a hemming apparatus and method for forming a generally flat hem.

BACKGROUND OF THE INVENTION

It is well known to construct motor vehicle body panels, doors, hoods, fenders, tailgates, trunks and deck lids by stamping an outer sheet metal panel and separately stamping an inner sheet metal reinforcing panel and then joining the two panels together by hemming a flange of the periphery of the outer panel over an adjacent edge of the inner panel to secure the panels together. Desirably, the outer panel is slightly larger than the inner panel to provide a border flange portion along the periphery of the outer panel which can be folded over the peripheral edge of the inner panel to define the hem flange which connects the two panels.

When the flange is folded over the peripheral edge of the inner panel with a traditional hemming apparatus and method, the resulting edge of the hemmed panels has a generally smooth, curved or arcuate shape with a diameter of the bend equal to twice the thickness of the outer panel plus the thickness of the inner panel. With inner and outer panels of the same thickness, the diameter of the bend for a standard hemming apparatus and method is equal to three times the thickness of a sheet metal panel. While many standard hemming methods and devices produce a smooth and fair hem or fold line, the relatively large bend diameter of the fold line is believed to reflect light in various directions along the curved fold line which is believed to give the visual appearance that the gap between adjacent hemmed panels of the vehicle body is larger than it actually is, is inconsistent or that the panels are not flush with one another.

In a conventional hemming process, the flange of the outer sheet metal panel is folded flat against the inner panel. In a different hemming process, which may be referred to as an "open hem" process, the flange of the outer sheet metal panel is folded back over the inner panel to secure them together, but the flange remains inclined to the inner panel resulting in a gap between the outer edge of the flange and the inner panel in which foreign material may collect. In use, this gap may also allow the inner panel to shift relative to the outer panel resulting in misalignment of the panels. Thus, this gap between the flange and inner sheet metal panel must be filled with a sealing material to prevent foreign material from collecting in the hem. This sealing operation increases the cost and time to assemble the panels of the vehicle body.

SUMMARY OF THE INVENTION

A hemming steel constructed to fold or hem a flange of an outer sheet metal panel onto an inner sheet metal panel has a forming face with a first, generally flat section and a second section inclined to the first section to provide a finished, hemmed flange having an outer portion closed or folded flat onto the inner sheet metal panel and an inner portion adjacent to the fold line which is inclined to the outer portion providing a significantly reduced radius or diameter of the fold line bend. The second section of the hemming steel is preferably generally planer such that the inner portion of the hemmed flange is generally flat and provides an outer bend diameter along the fold line of the outer sheet metal panel which is less than three times the thickness of the sheet metal panels and may be approximately equal to or less than the thickness of only the outer panel. The significantly reduced bend diameter is believed to provide a smooth and fair fold line which has a more consistent appearance when viewed from different angles to improve the appearance of the hemmed panels of the vehicle body in assembly. Visually, the gap between adjacent hemmed panels such as a fender panel and a door panel on a vehicle appears to be significantly narrower even though physically it is actually the same width as a prior conventionally hemmed adjacent panels. Further, with the outer portion of the hemmed flange folded flat against the inner sheet metal panel, no sealing operation is required to prevent foreign material from collecting between the flange and inner panel. The angle at which the second section of the forming face is inclined relative to the first section can be changed to allow the location of the peripheral edge of the inner panel to be varied relative to the fold line.

Objects, features and advantages of this invention include providing a hemming apparatus which produces a hemmed flange having a first portion inclined relative to a second portion from a relatively simple method and apparatus, provides a hemmed flange with a reduced bend diameter, provides a fold line which has a more consistent appearance when viewed from different angles, provides adjacent hemmed panels on a vehicle visually appearing to have a narrower or smaller gap between them, provides a closed hem thereby eliminating the need for a separate assembly operation to provide sealing material between the hemmed flange and inner panel, is readily adaptable for use with panels having a different configuration, is reliable, durable, of relatively simple design and economical manufacture and assembly and has a long, useful service life.

BRIEF DESCRIPTION OF THE DRAWINGS

These and other objects, features and advantages of this invention will be apparent from the following detailed description of the preferred embodiments and best mode, appended claims and accompanying drawings in which:

DETAILED DESCRIPTION OF THE PREFERRED EMBODIMENTS

Figure 1:
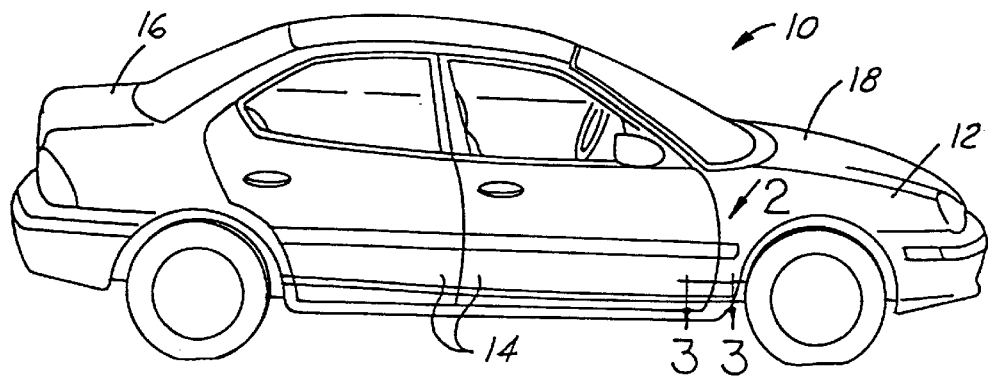
FIG. 1 is a perspective view of an automobile having various body panels formed from hemmed inner and outer sheet metal panels.
Figure 2:
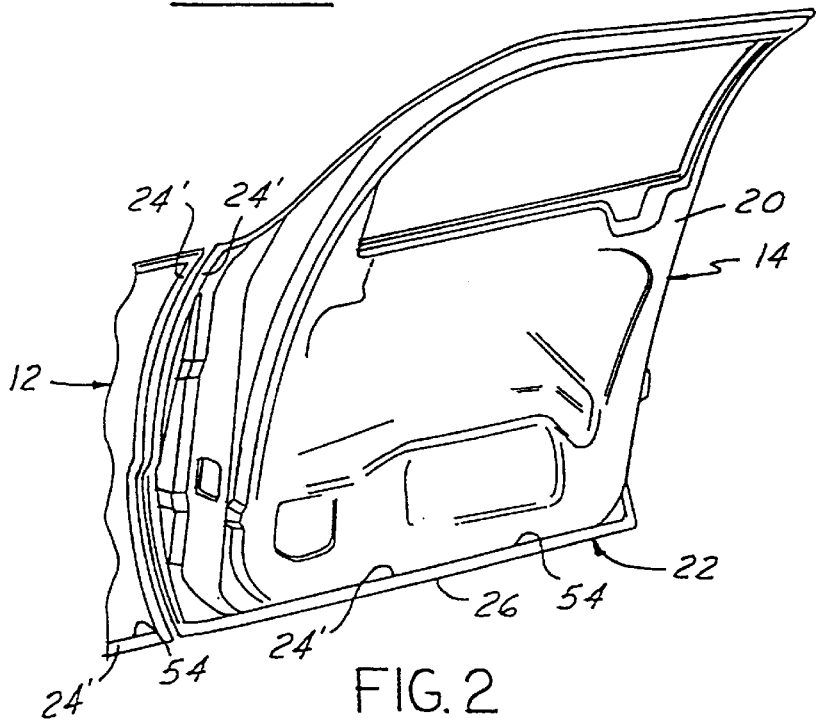
FIG. 2 is a perspective view of the interior of a vehicle door having hemmed inner and outer sheet metal panels.
Figure 3:
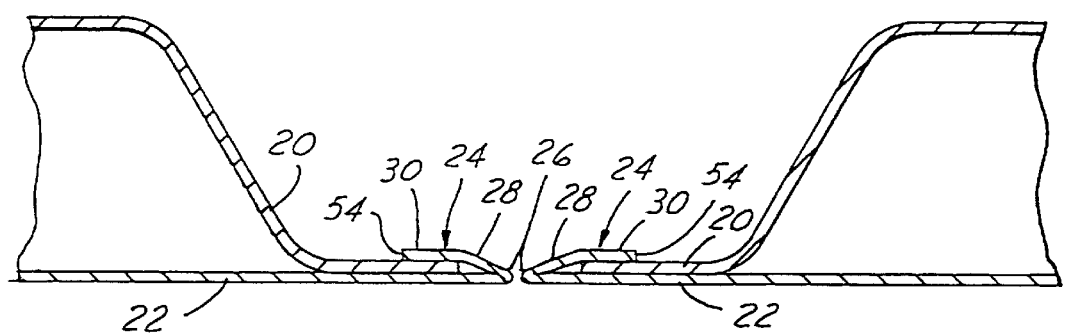
FIG. 3 is a cross-sectional view taken generally along line 3—3 of FIG. 1.
Figure 4:
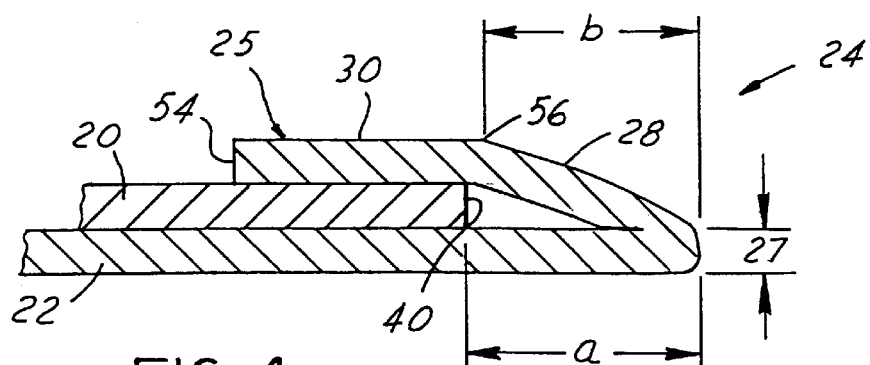
FIG. 4 is an enlarged fragmentary sectional view of the encircled portion 4 in FIG. 3.

Referring in more detail to the drawings, FIGS. 1 and 2 illustrate a vehicle 10 having various body panels 12, doors 14, a trunk 16 and a hood 18 wherein each may be formed from inner and outer sheet metal panels 20, 22 connected together by a hem 24 embodying the invention. As best shown in FIGS. 3 and 4, the various body panels 12, 14, 16, 18 of the vehicle 10 may each comprise an outer sheet metal panel 22 which is slightly larger than an inner sheet metal panel 20 and has a border flange 25 along the periphery of the outer panel 22 which is folded over or hemmed over the peripheral edge 40 of the inner panel 20 to form the hem 24 connecting two panels together. A smooth and fair hem outer edge 26 is required to avoid blemishes on the finished, painted panel and to ensure a consistent gap between adjacent panels.

Figure 5:
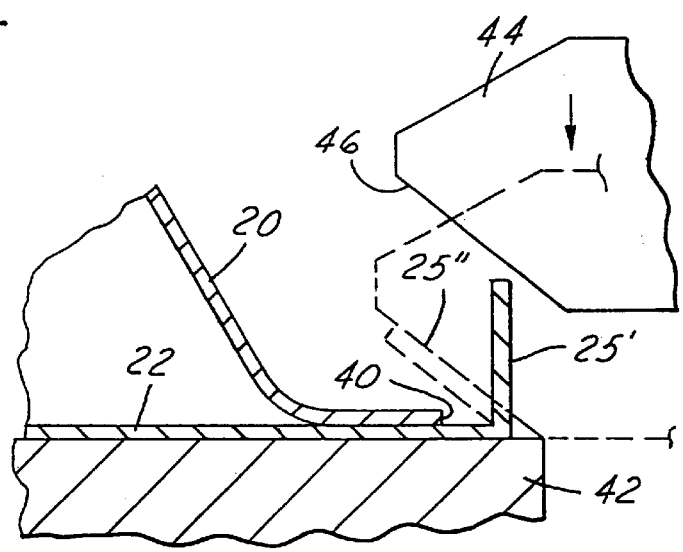
FIG. 5 is a fragmentary sectional view illustrating a prehem tool for initially bending the flange of the outer sheet metal panel.
Figure 6:
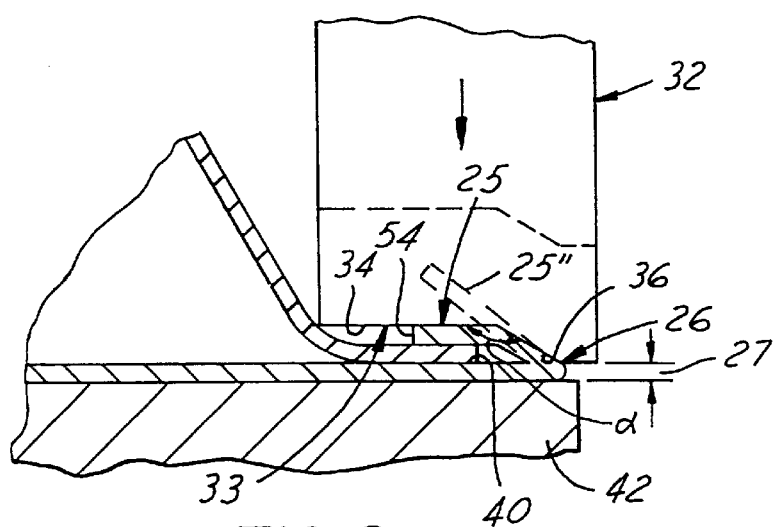
FIG. 6 is a fragmentary sectional view illustrating a final hem tool embodying the present invention.

FIGS. 5 and 6 illustrate a method and apparatus of the invention for hemming the flange 24' of the outer sheet metal panel 22' onto the inner sheet metal 20 panel to connect the panels 20, 22 together. The hemming method and apparatus provide a smooth and fair fold line defining the outer edge 26 of the outer panel 22 having a reduced outside bend diameter 27 which is less than three times the thickness of a sheet metal panel 20 or 22, desirably less than about twice the thickness of a sheet metal panel 20 or 22, and preferably generally equal to or less than the thickness of a single sheet metal panel 20 or 22, to improve the appearance of the outer edge 26 and of the automotive vehicle body in general. To achieve the reduced outside bend radius or diameter 27, the hemming apparatus and method produce a hemmed flange 24 which has an inner portion 28 adjacent the outer edge 26 which is generally flat and inclined relative to an outer portion 30 folded flat against the inner sheet metal panel 20.

The improved hem 24 may be produced with a standard hemming press utilizing an improved hemming tool 32 (FIG. 6) with an end forming face 33 having a first, generally planar section 34 constructed to form the outer portion 30 of the flange and a second portion 36 inclined relative to the first section 34 to form the inner portion 28 of the flange 24. As best shown in FIGS. 5 and 6, to form the hem, the inner sheet metal panel 20 is disposed on the outer sheet metal panel 22 which in turn is received on a locating and support fixture 42 in a press. A prehem tool 44 having an inclined forming face 46 is preferably carried by an upper platen of a press (not shown) and is advanced toward and engages the upstanding flange 25' of the outer sheet metal panel 22 to bend it from an initial included angle of approximately 90 degrees to a prehemmed acute included angle of between 25 and 75 degrees, and preferably about 45 degrees, to form a prehemmed flange 25". Thereafter, as shown in FIG. 6, the final hem tool 32 also carried by an upper platen of the press, is advanced toward the prehemmed flange 25" to bend the flange into its final, hemmed position and form the flange 25 having an outside bend diameter 27 which is less than three times the thickness of a sheet metal panel 20 or 22.

The final hem tool 32 has a forming face 33 with a generally planer first section 34 constructed to form the outer portion 30 of the flange 25 substantially flat onto the inner sheet metal panel 20 and thus provide a so called "closed hem" without any gap between an outside edge 54 of the flange 25 and the inner panel 20. The second section 36 of the forming face 33 is inclined at an obtuse included angle relative to the first section 34 and is also preferably generally planer to form the generally flat, inclined inner portion 28 of the hemmed flange 25 immediately adjacent to the outer edge 26 or bend in the outer sheet metal panel 22. Desirably, the second section 36 is disposed at an included angle α of about 100 to 160 degrees relative to the first section 34 and preferably about 135 degrees. The angle α may be varied to permit the location of the peripheral edge 40 of the inner sheet metal panel 20 to be varied relative to the outer edge 26 or hem line. Preferably, the second section 36 of the final hem tool 32 does not immediately overlie and is spaced outboard of the inner sheet metal panel 20 to prevent the inner sheet metal panel 20 from being unduly pinched by the inclined second section 36 of the hemming tool 32 and inner portion 28 of the flange 25. Thus, as shown in FIG. 4, the longitudinal distance "a" from the peripheral edge 40 of the inner panel 20 to the outer edge 26 of the outer panel 22 is preferably greater than the longitudinal distance "b" from the fold or bend 56 between the inner portion 28 of the flange 25 and the outer portion 30 and the outer edge 26 of the outer panel 22.

Figure 7:
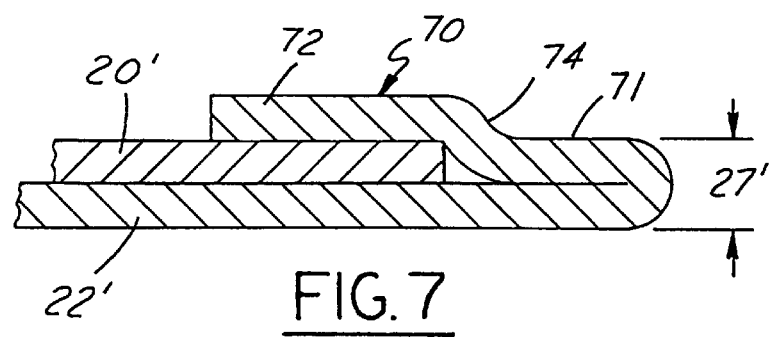
FIG. 7 is an enlarged fragmentary sectional view illustrating a hemmed flange formed according to an alternate embodiment of the invention.

A modified hemmed flange 70 is illustrated in FIG. 7 which has an outer bend diameter 27' equal to about twice the thickness of the outer sheet metal panel 22' with an inner portion 71 of the flange 70 folded flat onto the outer sheet metal panel 22' and an outer portion 72 of the flange 70 folded flat or closed on the inner sheet metal panel 20'. To prevent creasing of the flange 70 and to provide the outer portion 72 above the inner sheet metal panel 20', a smooth or generally arcuate transition or ramp section 74 is preferably provided between the inner and outer portions 71, 72 of the hemmed flange 70.

Figure 8:
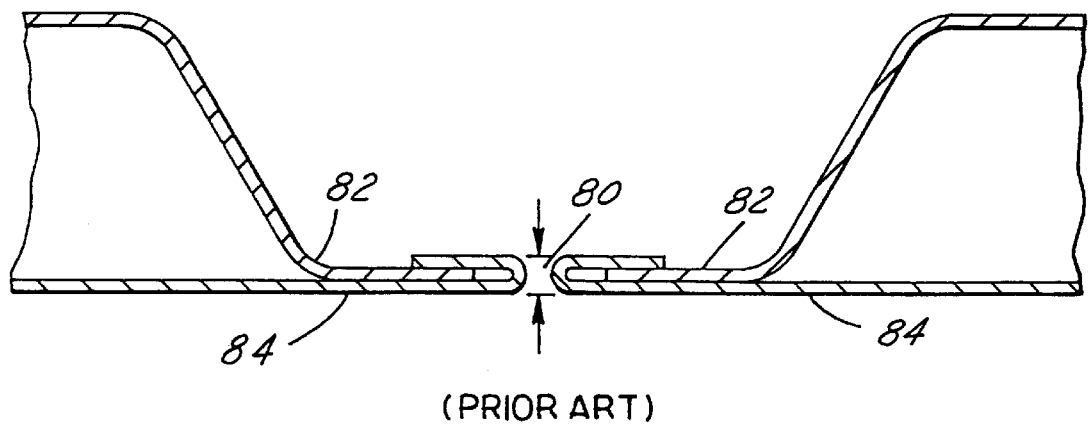
FIG. 8 is a fragmentary sectional view similar to that of FIG. 3 but illustrating flanges hemmed according to the prior art.

In either embodiment, the outer bend diameter 27,27' at the outer edge is substantially less than in the prior art, as shown in FIG. 8, wherein the outer bend diameter 80 of an outer panel 82 is equal to the sum of the thickness of the inner panel 82 and twice the thickness of the outer panel 84. If the panels 82 and 84 are of equal thickness the diameter of the bend 80 is equal to three times the thickness of either panel. Desirably, the outer bend diameter 27 may be generally equal to one or two times the thickness of the outer sheet metal panel 22 or less. The reduced bend diameter 27,27' of the present invention provides an improved appearance of the finished hemmed panels by themselves, and in assembly relative to the prior art hemmed panels they appear to have a substantially more uniform and smaller gap and a flush alignment.

What is claimed is:

1. A system for hemming a flange of a sheet metal panel, comprising:

a fixture adapted to receive and hold a sheet metal panel having a bend with a flange and a free edge of the flange;

a press having a platen movable towards and away from the fixture; and a hemming tool carried by the platen and having a forming face with a first generally planar section constructed to be disposed generally parallel to the underlying portion of the sheet metal panel to be hemmed and to engage an outer portion of the flange of the panel to be hemmed, and a second generally planar section inclined at an included angle of 110 to 160 degrees relative to the first section, extending toward the bend, and constructed to engage an inner portion of the flange immediately adjacent the bend to be hemmed, the forming face being configured so that when the moved platen moves the hemming tool sufficiently towards the fixture and the hemming tool engages the flange to be hemmed, the outer portion of the flange is engaged by the first section of the hemming tool and formed generally flat over and generally parallel to the underlying portion of the sheet metal panel and the inner portion of the flange is engaged by the second section of the hemming tool and formed generally flat at an obtuse included angle of 110 to 160 degrees relative to the outer portion and at an acute included angle to the underlying portion to provide a closed hem with the bend between the sheet metal panel and the inner portion having an outer diameter less than three times the thickness of the sheet metal panel.

2. The system of claim 1 wherein both the first and second sections of the hemming tool are each essentially planar.

3. The system of claim 1 wherein the second section of the forming face is inclined relative to the first section of the forming face at an angle of about 125 to 145 degrees.

4. The system of claim 1 wherein the fixture is constructed to receive inner and outer sheet metal panels with a flange of the outer panel to be hemmed over a peripheral edge of the inner panel and the second section of the forming face is outboard of the peripheral edge of the inner panel when the hemming tool is engaged with the flange such that only the first section of the forming face overlies the inner panel.

5. The system of claim 1 wherein the hemming tool bends the inner portion of the flange to the acute included angle between 25 to 75 degrees relative to the sheet metal panel.

6. The system of claim 1 wherein the flange hemmed by the hemming tool has an outer bend diameter which is less than twice the thickness of the sheet metal panel.

7. The system of claim 1 wherein the flange hemmed by the hemming tool has an outer bend diameter which is about equal to the thickness of the sheet metal panel.

8. A tool for hemming a flange of a sheet metal panel, comprising:

a body constructed to be carried by a press and having a forming face to hem a flange with a free edge of a sheet metal panel and a bend interconnecting the flange and the sheet metal panel, the body forming face having a first generally planar section constructed to be disposed adjacent the free edge of the flange and generally parallel to an underlying portion of the sheet metal panel to be hemmed and a second generally planar section inclined at an obtuse included angle of 110 to 160 degrees relative to the first section and constructed to engage an inner portion of the flange to be hemmed adjacent the bend, and the sections being configured to bend the flange so that upon hemming the tool forms a first part of the flange substantially flat and parallel to an underlying portion of the sheet metal panel and a second part of the flange substantially flat and at an acute included angle to the underlying portion of the panel and with the bend having a diameter of less than three times the thickness of the panel.

9. The tool of claim 8 wherein both the first and second sections of the forming face are substantially planar.

10. The tool of claim 8 wherein the second section of the forming face is inclined relative to the first section of the forming face at an angle of about 135 degrees.

11. The tool of claim 8 wherein the second section of the forming face extends generally outwardly of the body relative to the first section of the forming face.

12. A method of forming a generally flat hem in a sheet metal panel, the method comprising the steps of:

providing a sheet metal panel having a generally upstanding flange to be hemmed with a free edge and interconnected with the sheet metal panel by a bend;

providing a hemming tool having a forming face with a first substantially planar section disposed generally parallel to an underlying portion of the sheet metal panel and a second substantially planar section inclined at an obtuse included angle of 110 to 160 degrees relative to the first section, and extending outward from the first section toward the bend at an acute included angle to the underlying portion of the sheet metal panel, and the forming face being configured to form the flange with outer and inner flat portions and the bend with a maximum diameter less than three times the thickness of the sheet metal panel;

advancing the hemming tool towards the sheet metal panel to engage the hemming tool with the flange and to bend the flange over the sheet metal panel and thereby form the flange to correspond to the forming face with an outer portion folded generally flat and parallel to the underlying portion of the sheet metal panel and an inner portion folded generally flat and inclined relative to the outer portion at an obtuse included angle of 110 to 160 degrees and at an acute included angle to the underlying portion of the sheet metal panel to provide a closed hem with the bend between the sheet metal panel and the inner portion of the flange having a maximum diameter of less than three times the thickness of the sheet metal panel.

13. The method of claim 12 wherein the hemming tool is moved in a generally straight line motion.

14. The method of claim 12 wherein the diameter of the bend between the sheet metal panel and the hemmed flange is generally equal to twice the thickness of the sheet metal panel.

15. The method of claim 12 wherein the diameter of the bend between the sheet metal panel and the hemmed flange is generally equal to the thickness of the sheet metal panel.

16. The method of claim 12 wherein the diameter of the outer edge of the bend between the sheet metal panel and the hemmed flange is less than the thickness of the sheet metal panel.

\* \* \* \* \*

UNITED STATES PATENT AND TRADEMARK OFFICE
CERTIFICATE OF CORRECTION

PATENT NO.    : 6,257,043 B1
DATED         : July 10, 2001
INVENTOR(S)   : Philip V. Wiens It is certified that error appears in the above-identified patent and that said Letters Patent is hereby corrected as shown below:

Column 4,
Line 59, delete "moved".

Signed and Sealed this

Thirty-first Day of December, 2002

JAMES E. ROGAN
*Director of the United States Patent and Trademark Office*